United States Patent [19]

Kawaguchi et al.

[11] Patent Number: 4,571,361
[45] Date of Patent: Feb. 18, 1986

[54] ANTISTATIC PLASTIC FILMS

[75] Inventors: Hideo Kawaguchi, Kanagawa; Tsutomu Okita; Hiroyuki Tamaki, both of Shizuoka, all of Japan

[73] Assignee: Fuji Photo Film Co., Ltd., Kanagawa, Japan

[21] Appl. No.: 366,037

[22] Filed: Apr. 6, 1982

[30] Foreign Application Priority Data

Apr. 6, 1981 [JP] Japan .................................. 56-51581

[51] Int. Cl.⁴ .......................... B32B 5/16; B32B 15/00
[52] U.S. Cl. .................................... 428/328; 428/323; 428/329; 428/458; 428/461; 428/483
[58] Field of Search .............. 428/328, 483, 515, 458, 428/461, 922, 329, 323; 427/44, 54.1; 252/518, 511, 512; 204/159.24

[56] References Cited

U.S. PATENT DOCUMENTS

| | | | |
|---|---|---|---|
| 3,561,337 | 2/1971 | Mulkey | 428/328 |
| 3,957,694 | 5/1976 | Bolon et al. | 252/501.1 |
| 3,963,798 | 6/1976 | Miller | 427/44 |
| 4,146,031 | 3/1979 | Fujiyama et al. | 421/328 |
| 4,287,228 | 9/1981 | Schlesinger | 427/54.1 |
| 4,293,625 | 10/1981 | Myers | 428/328 |
| 4,410,584 | 10/1983 | Toba et al. | 428/328 |
| 4,416,963 | 12/1983 | Takimoto et al. | 428/328 |

FOREIGN PATENT DOCUMENTS 15099  2/1976  Japan .................................. 428/922

OTHER PUBLICATIONS

Jaromir Kosar, *Light-Sensitive Systems: Chemistry and Application of Nonsilver Halide Photographic Processes,* 1965.

*Primary Examiner*—Lorraine T. Kendell
*Attorney, Agent, or Firm*—Sughrue, Mion, Zinn, Macpeak, and Seas

[57] ABSTRACT

An antistatic plastic film is described. This comprised of a plastic film and at least one coating layer provided on the surface of the plastic film. The coating layer is prepared by dispersing electrically conductive fine particles in a compound containing an unsaturated bond capable of undergoing polymerization on irradiation with radiation or a binder containing the polymerizable compound. The electrically conductive fine particle comprising crystalline metal oxide of Zn, Ti, Sn, In, Si, Mo or W and/or composite oxide thereof. The resulting dispersion is coated on the plastic film, polymerized and cured by irradiation of the layer with radiation. The film can be easily, quickly and economically produced and is substantially transparent while providing improved antistatic properties good mechanical strength.

10 Claims, No Drawings

ANTISTATIC PLASTIC FILMS

FIELD OF THE INVENTION

The present invention relates to plastic films, and more particularly, to plastic films which are made antistatic.

BACKGROUND OF THE INVENTION

Plastic films generally generate and accumulate static electricity by contact or friction with various materials, or by being stripped from various materials during production or use thereof since they are electrically insulative. Such accumulated static electricity creates many problems. For example, it causes dust to be attacked to and to lie on the surface of the film, and may provide a strong electric shock to the user. In extreme cases, discharge occurs, causing combustion or ignition of inflammable substances which can lead to disaster. In the case of photographic films, such discharge traces result in the formation of static marks which is a serious defect for the film.

The invention is intended to provide substantially transparent plastic films which are made antistatic in order to remove problems caused by electrostatic charges.

The substantially transparent plastic film of the invention has many applications, such as wrapping, drawing, and drawing animations, as well as a support for recording materials, e.g., a support for silver halide photographic materials, a support for electrophotographic materials, and a support for magnetic films.

Methods which are known for preparing antistatic plastic films including (a) a method in which antistatic agents are incorporated into the plastic film, and (b) a method in which surface coating is applied onto the plastic film.

In accordance with the former method (a), the antistatic effect is insufficiently obtained unless the amount of the antistatic agent being incorporated is increased. Incorporation of the antistatic agent in such large amounts, however, results in the deterioration of mechanical properties or transparency of the plastic film.

Methods falling within the category of the latter method (b) include: (1) a method in which polymeric substances, surface active agents or the like are coated as an antistatic layer, (2) a method in which electrically conductive substances, e.g., carbon and metal powder, are coated as an antistatic layer, and (3) a method in which metals or metal oxides are vapor-deposited. Polymeric substances and surface active agents which can be used in the method (1) above are described in detail in Hideo Marumo, *Taidenboshi Zai (Antistatic Agents)*, Saiwai Shobo, Tokyo. These polymeric substances and surface active agents, however, are inferior with respect to antistatic capability at low humidities because their electrical conductivities vary depending on humidity. However, they can be easily coated. The carbon and metal powder as used in the method (2) are not suitable for use in the prevention of charging of plastic films which must be transparent since the antistatic layer becomes opaque when these materials are incorporated. Addition of such metal powder or carbon in large amounts in order to increase the electrical conductivity results in the deterioration of mechanical strength of the antistatic layer, and particularly in the deterioration of abrasion properties. With regard to method (3), there are known so-called vapor deposited transparent electrically conductive films which are prepared by vapor depositing indium oxide with tin doped thereon or tin oxide with antimony doped thereon (see, for example, *Hyomen (Surface)*, 18, 440 (1980)). This method, however, suffers from disadvantages in that the method of production is complicated, production costs are high, and the abrasion properties are inferior.

SUMMARY OF THE INVENTION

An object of the invention is to provide plastic films which are made antistatic.

Another object of the invention is to provide substantially transparent and antistatic plastic films.

Still another object of the invention is to provide plastic films which have good antistatic properties even at low humidities.

A further object of the invention is to provide plastic films with an antistatic layer having a high mechanical strength.

These and other objects are attained by dispersing electrically conductive fine particles in a compound containing an unsaturated bond capable of undergoing polymerization on irradiation with radiation (which herein refers to a "polymerizable compound") or a binder containing the polymerizable compound, providing the resulting dispersion on a plastic film to form at least one layer, and polymerizing and curing the layer by irradiation with radiation. The electrically conductive fine particles comprise at least one crystalline metal oxide of Zn, Ti, Sn, In, Si, Mo or W and/or composite oxide thereof.

1 DETAILED DESCRIPTION OF THE INVENTION

It has been found that sufficient electrical conductivity can be obtained even at low humidities by the use of fine particles of crystalline metal oxides and/or composite oxides.

Japanese Patent Publication No. 6616/70 discloses a technique to use stannic oxide as an antistatic agent. In this technique, however, there is used amorphous stannic oxide colloid, and the function of the electrically conductive layer cannot be sufficiently exhibited at low humidities because of the dependence of electrical properties on humidity.

Fine particles of crystalline metal oxides or composite oxides thereof as used herein have a specific volume electric resistance of $10^7$ $\Omega$-cm or less, preferably $10^5$ $\Omega$-cm or less.

The grain size is preferably small enough to minimize light scattering. The grain size is determined with respect to the ratio of the refractive index of the fine particle to the polymerizable compound or binder. Therefore, although the grain size varies depending on the fine particle and the polymerizable compound or binder used, it is usually from 0.01 to 0.7 micron and preferably from 0.02 to 0.5 micron. By using particles having such grain sizes, there can be obtained the desired substantially transparent film.

Fine particles of crystalline metal oxides or composite oxides thereof which are used in the present invention can be prepared by the method as described in detail in published unexamined British Patent Application No. 2075208 (corresponding to U.S. patent application Ser. No. 253,499). In addition, there can be used a method in which fine particles of metal oxide are prepared by burning and are subjected to a heart-treatment in the presence of different atoms to improve electrical conductivity. In accordance with another method, fine particles of metal oxide are prepared by burning in the presence of different atoms to improve electrical conductivity. In accordance with still another method, while preparing fine metal particles by burning, the concentration of oxygen in the atmosphere is lowered to introduce oxygen defects.

Different atoms which can be used include Al, In, etc. for ZnO; Nb, Ta, etc. for $TiO_2$; and Sb, Nb, halogen elements, etc. for $SnO_2$. The amount of the different atom added is preferably within the range of from 0.01 to 30 mole % and more preferably within the range of from 0.1 to 10 mole %.

The polymerizable compounds are monomers, oligomers and polymers, containing a vinyl or vinylidene group. Examples of such monomers containing a vinyl or vinylidene group include styrene and its compounds, e.g., α-methylstyrene and β-chlorostyrene, acrylic acid and methacrylic acid, and their compounds, e.g., alkyl acrylate (alkyl group: containing 1 to 4 carbon atoms), alkyl methacrylate (alkyl group: containing 1 to 4 carbon atoms), glycidyl acrylate, glycidyl methacrylate, ethylene diacrylate, diethylene glycol diacrylate, ethylene dimethacrylate, glycerol trimethacrylate, pentaerythritol tetramethacrylate, aryl methacrylate, and aryl acrylate, vinyl acetate, acrylonitrile, methacrylonitrile, itaconic acid, maleic anhydride, acrylamido diarylphthalate, and diaryl fumarate.

Preferred examples of oligomers and polymers are compounds containing a double bond or bonds in the main chain thereof or compounds containing an acryloyl or methacryloyl group at both ends of the straight chain. These compounds are referred to in A. Vrancken, *Fatipec Congress*, 11, 19 (1972). Examples are listed below:

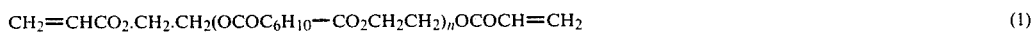

(1)

n = 1~10

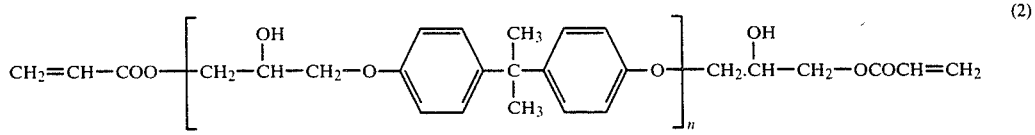

(2)

n = 1~10

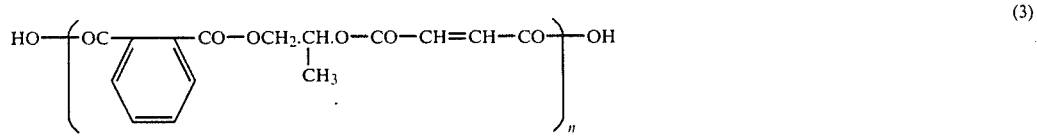

(3)

n = 1~10

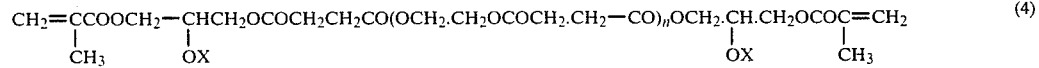

(4)

X:H or alkyl
n = 1~15

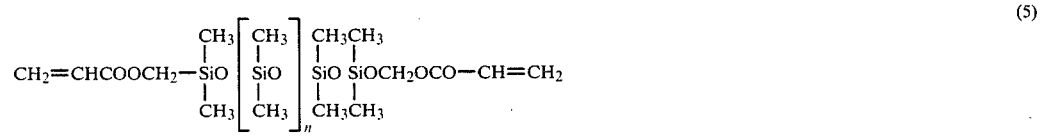

(5)

n = 1~10

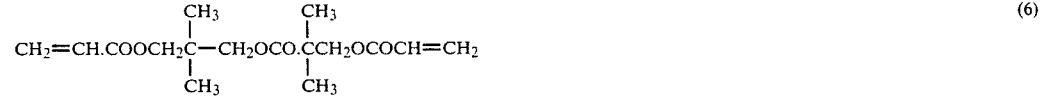

(6)

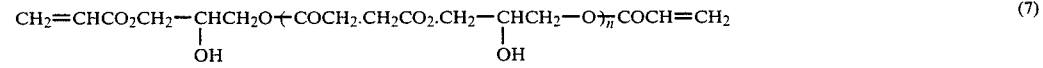

(7)

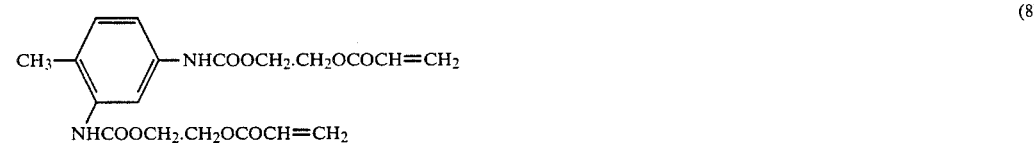

(8)

More preferred examples of polymers are compounds containing an acryloyl group at both ends of the straight chain.

Electrically conductive fine particles may be dispersed in the polymerizable compound as described above and then coated on a plastic film. Alternatively, they may be dispersed in a binder, and after addition of the polymerizable compound to the resulting dispersion it is coated on a plastic film. It is preferred that the fine particles are dispersed in the polymerizable compound.

Any polymers normally used in coating can be used as the binder. Examples include cellulose esters, e.g., cellulose acetate, cellulose nitrate, cellulose acetate butyrate, and cellulose propionate, soluble polyesters, polycarbonates, soluble nylons, polyvinyl chloride, vinyl chloride-containing copolymers, polyvinylidene chloride, vinylidene chloride-containing copolymers, polystyrene, styrene-containing copolymers, polyvinyl acetate, vinyl acetate-containing copolymers, and alkyl acrylate-containing copolymers (alkyl group: containing 1 to 4 carbon atoms).

Solvents for these polymerizable compounds and these binders include ketones, e.g., acetone, methyl ethyl ketone, methyl isobutyl ketone, and cyclohexanone, esters, e.g., methyl acetate, ethyl acetate, butyl acetate, ethyl lactate, and acetic acid glycol monoethyl ether, glycol ethers, e.g., glycol dimethyl ether, glycol monomethyl ether, glycol monoethyl ether, and dioxane, aromatic hydrocarbons, e.g., benzene, toluene and xylene, chlorinated hydrocarbons, e.g., methylene chloride, ethylene chloride, chlorothen, and trichlene, alcohols, e.g., methanol, ethanol, propanol, and butanol, dimethylformamide, dimethylsulfoamide, and phenol.

The amount of fine electrically conductive particles being used is usually from 0.05 to 20 g and preferably from 0.1 to 10 g, per square meter of the plastic film.

Fine electrically conductive particles may be made of one or more metal oxides, or be made of a metal composite oxide alone or a combination of a metal oxide and a composite oxide. It is preferred that the fine electrically conductive particles are crystalline metal oxides alone.

The volume ratio of fine electrically conductive particles to binder plus polymerizable compound is preferably from 10/1 to 1/6 and more preferably from 8/1 to ¼. Of course, this range varies depending on the type and composition of the plastic film, and the size of fine electrically conductive particles. The weight ratio of binder to polymerizable compound is preferably from 8/2 to 0/10.

The composition in which fine electrically conductive particles are dispersed may be supplemented by adding a sensitizer, a slipping agent, a dispersant, and so forth.

Sensitizers which can be preferably used include compounds represented by the following formulae:

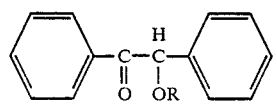

(wherein R is an alkyl group containing 2 to 8 carbon atoms)

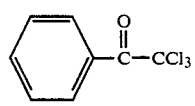

-continued

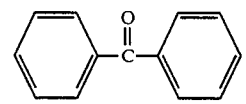

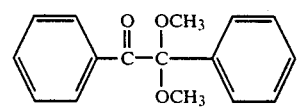

The amount of the sensitizer added is preferably from 3 to 20% based on the total weight of the polymerizable compound and the binder. Of course, it varies depending on the amount of fine electrically conductive particles added.

Slipping agents which can be preferably used include saturated or unsaturated higher aliphatic acids, aliphatic acid amides, and silicone oil. Preferred examples of dispersants include titanium coupling agents, silane coupling agents, lecithin, and amido compounds.

Plastic films which can be preferably used are made of polyesters, e.g., polyethylene terephthalate and polyethylene naphthalate, polyolefins, e.g., polyethylene and polypropylene, cellulose esters, e.g., cellulose triacetate, cellulose diacetate, cellulose acetate propionate, cellulose acetate butyrate, and cellulose nitrate, vinyl-based plastics, e.g., polyvinyl chloride, polyvinylidene chloride, and polystyrene, polycarbonate, polyimide, polyamidoimide, polycarbonate, or the like.

The dispersion composition layer as described above can be provided on the plastic film by various techniques such as blade coating, air knife coating, gravure coating, rod coating, reverse roll coating, spray coating, and transfer roll coating. These techniques are described in detail in Yuzi Ozaki, *Coating Engineering*, Asakura Shoten, Tokyo. The gravure coating is described in detail in G. E. Booth, *Coating Equipment and Process*, Lockwood Pub, Co. Inc. (US).

Radiations which can be used for polymerization and curing include electron rays, ultraviolet rays, X rays, and γ rays.

As an electron ray accelerator for use in irradiation with electron rays, a Van de Graf type scanning system, a double scanning system, and a curtain beam system can be used. It is preferable to use a curtain beam system which is relatively inexpensive and can produce a large output. With regard to electron ray characteristics, the acceleration voltage is usually from 100 to 1,000 kV and preferably from 150 to 300 kV. The adsorbed dose is usually from 0.5 to 20 Mrad and preferably from 2 to 10 Mrad.

Irradiation with electron rays is described in detail in J. Silverman and A. R. Van Dyken, *Radiation Processing*, (1977).

An apparatus and conditions for irradiation with ultraviolet rays are described in detail in Inomata, *Shikizai (Dye Materials)*, 53, 530 (1980) and Yoshida, *Toso Gizyutsu (Coating Technology)*, 14, 83 (1975). It is preferable to use ultraviolet light of from 200 to 400 nm.

In accordance with the invention, the fine electrically conductive dispersion composition is coated, dried, and then irradiated with radiation to obtain the desired plastic film which is substantially transparent. The film has excellent scratch resistance, abrasion resistance, and antistatic properties.

When the plastic film of the invention is used as a support for photographic light-sensitive materials, the surface treating method, light-sensitive compositions, and so forth are not subject to any special limitations, and can be determined by referring to the description in *Research Disclosure*, Vol. 185, pp. 22 to 31 (December 1978).

The following Examples and Comparative Example are given to illustrate the invention in greater detail although the invention is not limited thereto. In the examples and the comparative example, all parts are by weight.

EXAMPLE 1

A mixture of 65 parts of stannic chloride hydrate and 1.5 parts of antimony trichloride was dissolved in 1,000 parts of ethanol to prepare a uniform solution. To the thus-prepared uniform solution was added dropwise a 1N aqueous solution of sodium hydroxide until the pH thereof reached 3 to obtain a coprecipitate of stannic oxide and antimony oxide. The coprecipitate was allowed to stand at 50° C. for 24 hours to obtain a red-brown colloidal precipitate.

The red-brown colloidal precipitate was separated by centrifugal separation. In order to remove excessive ions, water was added to the precipitate, which was then washed with water by centrifugal separation. This procedure was repeated three times to remove excessive ions.

In 900 parts of water was again dispersed 100 parts of the colloidal precipitate removed of excessive ions. The resulting dispersion was sprayed into a burning furnace heated up to 600° C. to obtain bluish fine powder having a mean grain size of 0.2 micron.

The resulting product (1 g) was placed in an insulative cylinder having an inner diameter of 1.6 cm, and while applying a pressure of 1,000 kg/cm$^2$ from the bottom and top thereof by the use of a stainless steel electrode, the specific volume electric resistance of the powder was measured and found to be 8 Ω-cm.

The thus-prepared powder was used to prepare a dispersion having the composition as described below in a ball mill.

| | |
|---|---|
| Powder | 150 parts |
| Urethane-based Acrylate | 20 parts |
| (prepared in the same manner as in Example 1 of U.S. Pat. No. 4,092,173) | |
| Diethylene glycol diacrylate | 10 parts |
| Methyl acrylate | 5 parts |
| Methyl ethyl ketone | 300 parts |

The dispersion was coated on a 100 micron thick cellulose acetate support in a dry thickness of 2 microns, and the resulting coating layer was dried.

After the layer was dried, radiation was applied at an acceleration voltage of 200 kV and a beam current of 10 mA so that the absorbed dose would be 5 Mrad. The thus-prepared film was substantially transparent and exhibited high abrasion resistance.

The surface electrical resistance was $3 \times 10^6$ Ω at a temperature of 25° C. and a relative humidity of 60%. Even when the relative humidity was lowered to 10% while maintaining the temperature at 25° C., no change was observed in the surface electrical resistance.

EXAMPLE 2

| | |
|---|---|
| Same powder as prepared in Example 1 | 10 parts |
| Same urethane-based acrylate as used in Example 1 | 15 parts |
| Hexanediol diacrylate | 5 parts |
| Butoxyethyl acrylate | 10 parts |
| Methyl ethyl ketone | 290 parts |
| Phenol | 10 parts |

A dispersion having the composition as described above was coated on a 100 micron thick polyethylene terephthalate support by the use of a doctor blade so that the dry thickness would be 3 microns and dried. Then, radiation was applied at an acceleration voltage of 200 kV and a beam current of 10 mA so that the absorbed dose would be 5 Mrad.

For the thus-prepared film, the surface electrical resistance was $2 \times 10^7$ Ω at a temperature of 25° C. and a relative humidity of 25%, and the haze was 10%.

EXAMPLE 3

| | |
|---|---|
| Acryl-based oligomer | 75 parts |
| Same powder as prepared in Example 1 | 300 parts |
| Methyl ethyl ketone | 100 parts |
| Benzoyl ethyl ether (trade name: Aronix; produced by Toa Gosei Chemical Industry Co., Ltd.) | 6 parts |

A dispersion having the composition as described above was coated on a polyethylene terephthalate film which had been undercoated with a vinylidene chloride-based latex so that the dry thickness would be 5 microns, and dried.

The thus-prepared coating film was placed at a distance of 10 cm below a 80 W/cm high pressure mercury lamp and irradiated in a nitrogen atmosphere for 1 minute.

For the coating film, the surface electrical resistance was $3 \times 10^7$ Ω at a temperature of 25° C. and a relative humidity of 25%.

EXAMPLE 4

| | |
|---|---|
| Zinc oxide | 100 parts |
| 10% Aqueous solution of Al(NO$_3$)$_3$.9H$_2$O | 5 parts |
| Water | 100 parts |

A mixture consisting of the above ingredients was subjected to supersonic wave vibration for 20 minutes to prepare a uniform dispersion.

The dispersion was dried at 110° C. for 1 hour and, thereafter, was burned at $1 \times 10^{-4}$ Torr and 600° C. for 5 minutes to obtain zinc oxide having a specific volume resistance of $2 \times 10^2$ Ω-cm. The grain size was 2 microns. These particles were pulverized in a ball mill to provide particles having a mean grain size of 0.7 micron.

A film was prepared in the same manner as in Example 1 except that the above prepared zinc oxide particles were used in place of the tin oxide particles.

The thus-prepared film was substantially transparent had a surface electrical resistance of $5 \times 10^7$ Ω at a temperature of 25° C. and a relative humidity of 25%, and exhibited excellent abrasion resistance.

COMPARATIVE EXAMPLE

A dispersion having the composition as described below was prepared in a ball mill.

| Same powder as prepared in Example 1 | 150 parts |
|---|---|
| Methyl acrylate - butyl acrylate copolymer*1 | 35 parts |
| Methyl ethyl ketone | 300 parts |

*1: Methul acrylate-butyl acrylate copolymer (copolymerization ratio: 8:2, Molecular weight: about 300,000), which is fallen outside the scope of the compounds of the invention containing an unsaturated bond capable of undergoing polymerizationon irradiation with radiation.

The dispersion was coated on a 100 micron thick cellulose acetate support in a dry thickness of 2 microns, and the resulting coating layer was dried.

The thus-prepared film was compared with the film prepared in Example 1 with respect to scratch-resistance according to the following method.

Scratch-Resistance Test: The surface of the film was scratched with a diamond needle having a tip end diameter of 0.2 mm at a pressure of 15 g, and the extent of scratch was estimated by observed with naked eyes.

On the surface of the film prepared in Example 1, the scratch was not observed, whereas on the surface of the film prepared in this comparative example, the scratch was remakably observed.

While the invention has been described in detail and with reference to specific embodiments thereof, it will be apparent to one skilled in the art that various changes and modifications can be made therein without departing from the spirit and scope thereof.

What is claimed is:

1. A plastic film with at least one coating layer provided thereon wherein said coating layer is prepared by:
    dispersing electrically conductive fine particles having a specific volume resistance of $10^7$ $\Omega$-cm or less in a compound containing an unsaturated bond capable of undergoing polymerization on irradiation with radiation or a binder containing the polymerizable compound, said electrically conductive fine particles comprising crystalline metal oxide of Zn, Ti, Sn, In, Si, Mo, or W and/or composite oxide thereof, and said polymerizable compound is selected from the group consisting of monomers, oligomers and polymers each containing a vinyl or vinylidene group;
    coating the resulting dispersion on the plastic film; and
    polymerizing and curing the layer by irradiation with radiation.

2. A plastic film as claimed in claim 1, wherein said coating layer prepared by:
    dispersing electrically conductive fine particles in a compound containing an unsaturated bond capable of undergoing polymerization on irradiation with radiation, said electrically conductive fine particles comprising crystalline metal oxide of Zn, Ti, Sn, In, Si, Mo or W; and
    coating the resulting dispersion on the plastic film; and
    polymerizing and curing the layer by irradiation with radiation.

3. A plastic film as claimed in claim 1, wherein said specific volume resistance is $10^5$ $\Omega$-cm or less.

4. A plastic film as claimed in claim 3, wherein the electrically conductive particles have a grain size of from 0.01 to 0.7 microns.

5. A plastic film as claimed in claim 4, wherein said electrically conductive particles have a particle size of from 0.02 to 0.5 microns.

6. A plastic film as claimed in claim 5, wherein the electrically conductive particles are contained on the plastic film in an amount of 0.05 to 20 grams per $m^2$ of plastic film.

7. A plastic film as claimed in claim 6, wherein the electrically conductive particles are contained on the plastic film in an amount of 0.1 to 10 grams per $m^2$ of plastic film.

8. A plastic film as claimed in claim 1, further comprising a sensitizer contained within the binder in an amount of 3 to 20% by weight based on the total weight of the polymerizable compound and the binder.

9. A plastic film as claimed in claim 1, wherein said binder contains at least two compounds containing unsaturated bonds capable of undergoing polymerization on irradiation with radiation.

10. A plastic film as claimed in claim 1, wherein the electrically conductive fine particles are present in an amount to render the plastic film antistatic and are present in a size such that the plastic film is transparent, the size of the electrically conductive fine particles minimizing light scattering.

* * * * *